US008699355B2

(12) United States Patent
Macias

(10) Patent No.: US 8,699,355 B2
(45) Date of Patent: Apr. 15, 2014

(54) METHOD AND SYSTEM FOR PERFORMING NETWORK DIAGNOSTICS UTILIZING A SECONDARY COMMUNICATIONS MEDIUM

(75) Inventor: Jose J. Macias, Grand Prairie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 494 days.

(21) Appl. No.: 11/960,814

(22) Filed: Dec. 20, 2007

(65) Prior Publication Data
US 2009/0161557 A1    Jun. 25, 2009

(51) Int. Cl.
*H04L 12/26* (2006.01)

(52) U.S. Cl.
CPC ............ *H04L 12/2697* (2013.01); *H04L 43/50* (2013.01)
USPC ........................................................ 370/242

(58) Field of Classification Search
USPC ................................................. 709/223–226
See application file for complete search history.

(56) References Cited

U.S. PATENT DOCUMENTS

| 6,141,326 A * | 10/2000 | Minami ........................ 370/244 |
| 6,510,454 B1 * | 1/2003 | Walukiewicz ................ 709/206 |
| 6,601,210 B1 * | 7/2003 | Kagan ............................ 714/758 |
| 6,973,486 B2 * | 12/2005 | Blakeney ....................... 709/220 |
| 7,242,862 B2 * | 7/2007 | Saunders et al. ............... 398/30 |
| 2003/0177215 A1 * | 9/2003 | Sutherland et al. ........... 709/223 |
| 2003/0210387 A1 * | 11/2003 | Saunders et al. ............... 356/73 |
| 2004/0156635 A1 * | 8/2004 | Felske et al. .................... 398/66 |
| 2006/0031454 A1 * | 2/2006 | Ewing et al. ................... 709/223 |
| 2009/0097397 A1 * | 4/2009 | Moreira Sa de Souza .... 370/216 |

\* cited by examiner

*Primary Examiner* — Chi Pham
*Assistant Examiner* — Kouroush Mohebbi

(57) ABSTRACT

A method, comprising detecting a problem associated with a network communications link of a primary communications medium, performing one or more actions on a first network element communicatively coupled to the network communications link in response to detection of the problem, and transmitting data associated with the problem from the first network element to a second network element utilizing a secondary communications medium.

18 Claims, 3 Drawing Sheets

METHOD AND SYSTEM FOR PERFORMING NETWORK DIAGNOSTICS UTILIZING A SECONDARY COMMUNICATIONS MEDIUM

BACKGROUND INFORMATION

In the event of a network problem, a technician attempting to diagnose the problem from a central location has limited information available. Frequently a technician will have to travel to one or more locations in order to diagnose the network problem. Once a source of the network problem is diagnosed, the problematic equipment may be owned by a different company, the technician may not be qualified to repair the problematic equipment, or a repair may require materials or equipment not carried by the technician. Additional personnel, equipment and/or materials may need to be sent to the location of the equipment or travel to other locations for further diagnostics or repair may be required thus increasing the delay and cost of the repair.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a system for performing network diagnostics utilizing a secondary communications medium. The system may enable a service provider to diagnose and/or address a problem with a communications link while reducing the travel time for its technicians.

Figure 1:
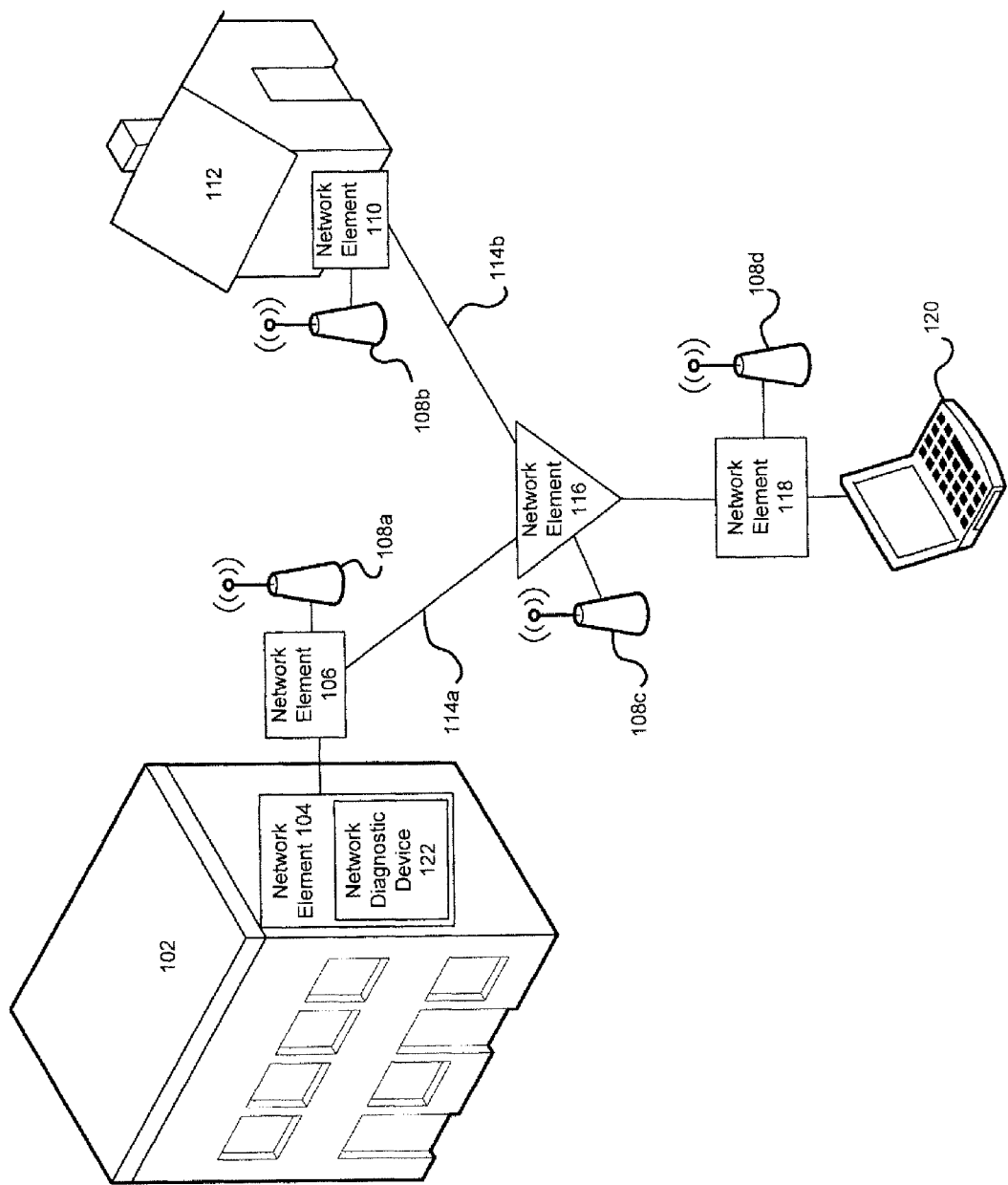
FIG. 1 depicts a network having a system for performing network diagnostics utilizing a secondary communications medium, in accordance with an exemplary embodiment.

Referring to FIG. 1, a network having a system for performing network diagnostics utilizing a secondary communications medium system in accordance with an exemplary embodiment is illustrated. FIG. 1 is a simplified depiction of system 100 and may include additional elements that are not depicted. As illustrated, links 114a and 114b may represent network connectivity between two points or links in a network, such as links in a Passive Optical Network (PON), a wired network or a wireless network. Link 114a may connect one or more network users in building 102 to network element 116 via network elements 104 and 106. Link 114b may connect one or more network users in building 112 to network element 116 via network element 110. Links 114a and 114b may be links in a wired network line, a wireless network line, or a fiber link, such as a fiber link of a passive optical network. Link 114a may transmit data for one or more end users, such as end users of network element 104. One or more network elements, such as network element 104, may contain network diagnostic devices such as network diagnostic device 122. Network diagnostic device 122 may contain a transmitter and/or a receiver (not shown) which may enable wireless transmission of diagnostic information and reception of queries or commands. In some embodiments, a network diagnostic device may be a portion of a network access device. Network access devices 108a, 108b, 108c and 108d may be wireless access points (WAP), network diagnostic devices or other network devices which may be capable of sending and/or receiving wireless transmissions, performing network diagnostics on a network device, and/or performing other actions on a network device. Network element 116 may connect multiple links of a network together. Network element 118 may be a network element at a location of a network operator, a network owner or a service provider. Computer 120 may be a computer operated by a network technician of a network operator, a network owner or a service provider.

Network access devices 108a, 108b, 108c and 108d may be repeaters, microwave antennas, cellular towers, or other network access devices capable of providing connectivity between two different network mediums. Network access devices 108a, 108b, 108c and 108d may be capable of sending and/or receiving signals via a mobile network, a paging network, a cellular network, a satellite network or a radio network. Network access devices 108a, 108b, 108c and 108d may provide connectivity to one or more wired networks and may be capable of receiving signals on one medium such as a wired network and transmitting the received signals on a second medium such as a wireless network. Network access devices 108a, 108b, 108c and 108d may contain unique identifiers. The unique identifiers may enable a network access device to determine that a broadcast, unicast, anycast or multicast message is directed to them. Network access devices 108a, 108b, 108c and 108d may ignore one or more messages containing an identifier not matching its assigned unique identifier. Network access devices 108a, 108b, 108c and 108d may also use their unique identifiers in a transmission to identify themselves as the originator of the transmission. Network access devices 108a, 108b, 108c and 108d may utilize encryption including shared secrets, digital certificates and/or public keys.

Network access devices 108a, 108b, 108c and 108d may transmit and/or receive data to and/or from a network utilizing a standard telecommunications protocol or a standard networking protocol. For example, one embodiment may utilize Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data. Data may be transmitted or received wirelessly and/or may utilize cabled network or telecom connections such as an Ethernet RJ45/Category 5 Ethernet connection, a fiber connection, a traditional phone wireline connection, a cable connection or another wired network connection. Network access devices 108a, 108b, 108c and 108d may use standard wireless protocols including IEEE 802.11a, 802.11b and 802.11g. Network access devices 108a, 108b, 108c and 108d may also be connected to a network via protocols for a wired connection, such as an IEEE Ethernet 802.3. Network access devices 108a, 108b, 108c and 108d may also be modems, routers, switches or other network access devices. Network access devices 108a, 108b, 108c and 108d may utilize a secondary wired link to transmit and receive data.

Network diagnostic devices may, in some embodiments, contain one or more network access devices. In some embodiments, network devices, such as network elements 104, 106, 110, 116 and/or 118, may contain one or more network diagnostic devices. According to some embodiments, network diagnostic devices may be one or more separate devices communicatively coupled to one or more network devices and/or one or more network access devices, such as network access devices 108a, 108b, 108c and 108d. Network diagnostic devices may receive a request for information via a network access device. The network access device may enable a network diagnostic device to transmit and/or receive data when one or more communications links is experiencing a problem. Network diagnostic devices are described in more detail in reference to FIG. 2 below.

The network may be a local area network (LAN), a wide area network (WAN), the Internet, cellular networks, satellite networks, a passive optical network or other networks that permit the transfer and/or reception of data. The network may utilize one or more protocols of network clients. The network may translate to or from other protocols to one or more protocols of network clients.

Network elements, network diagnostic devices and/or network access devices may include one or more processors (not shown) for recording, transmitting, receiving, and/or storing data. Although network elements and/or network access devices are depicted as one element, it should be appreciated that the contents of a network element, network diagnostic devices and/or network access devices may be combined into fewer or greater numbers of devices and may be connected to one or more data storage systems. Furthermore, the one or more devices may be local, remote, or a combination thereof a first network element, network diagnostic device and/or network access device.

Building 102 may be an office building or multi-family dwelling or other building receiving network access. Building 102 may contain or be communicatively coupled with one or more network elements 104, which may be residential gateways, routers, optical network terminals (ONT), customer premise equipment (CPE) or other network equipment enabling the connection of one or more end user devices to a network. Network element 104 may contain network diagnostic device 122 for performing one or more diagnostic or corrective actions or measurements. Network diagnostic device 122 may contain a network access device for reception and/or transmission of data related to diagnosis of network element 104 via one or more secondary communications mediums, such as a wireless network.

Network element 106 may be a splitter, a hub, an optical amplifier, an optical network unit (ONU), a fiber drop terminal or other network equipment. Network element 106 may contain one or more network diagnostic devices or be communicatively coupled to one or more network diagnostic devices. Network element 106 may transmit or receive data via link 114a or via a secondary communications medium which may be accessible via network access device 108a. Network access device 108a may contain one or more network diagnostic devices or may be communicatively coupled to one or more network diagnostic devices.

Network element 116 may be a hub, a router or a splitter, such as a 1×32 optical splitter. Network element 108c may be a network access device providing access to a secondary communications medium for network element 116.

Building 112 may be a residence, business or other building communicatively coupled to a network. Building 112 may contain or be communicatively coupled with network element 110. Network element 110 may be a residential gateway, router, optical network terminal (ONT), customer premise equipment (CPE) or other network equipment enabling the connection of one or more end user devices to a network.

Network access device 108b may be a network access device providing access to a secondary communications medium for network element 110.

Network element 118 may be a hub, a router, a gateway, a bridge, an optical line termination (OLT), a head end or other network device which may be located at the premises of a service provider, network operator or network owner. Network element 118 may contain one or more network diagnostic devices or be communicatively coupled to one or more network diagnostic devices. Network access device 108d may be a network access device providing access to a secondary communications medium for network element 118. Network access device 10d may contain one or more network diagnostic devices or be communicatively coupled to one or more network diagnostic devices.

A technician or other personnel may access the network via computer 120 which may be communicatively coupled to network element 118. Computer 120 may be a laptop, desktop, personal digital assistant or other computing device. Computer 120 may utilize software to produce a graphical user interface (GUI) for monitoring network status and/or data received from or transmitted to one or more network diagnostic devices. Computer 120 may utilize a GUI to present, to a technician, a current status of a network device communicatively coupled to a network diagnostic device. The GUI may display information including the power status of a network device, the signals transmitted by or received by a network device, the status of one or more indicators of a network device, the contents of memory of a network device, the results of diagnostic tests on a network device, the version and/or presence of software contained on a network device and other network device related information. A technician may monitor the status of one or more network links, such as link 114a and link 114b, from computer 120. A technician receiving information about an outage, a signal loss, a network performance problem or other network issues may utilize computer 120 to diagnose the problem. For example, a technician may send one or more requests for data or for diagnostic or corrective actions. A page, a text message or other wireless communication may be sent from computer 120 via network access device 108d. The technician may send a unicast message which may utilize a device identifier to route the message directly to a specific network access device. The technician may also send a broadcast, multicast or anycast message requesting data, diagnostic actions or corrective actions. A network diagnostic device may receive the message. The network diagnostic device may decrypt the message using stored encryption information. The network diagnostic device may utilize a device identifier in the message to determine if it needs to respond to the message. If the device identifier in the message matches an identifier stored in memory associated with the network diagnostic device, the network diagnostic device may power up one or more components and respond to the request.

In some embodiments, a technician may send a request which may identify a source of or a geographic location of an outage. For example, a technician may send a broadcast request stating that no signal was received at network element 116 from network element 104. Network diagnostic devices receiving the broadcast message may use routing tables, geographic information, subnet information or other information to determine their proximity to potential sources of the outage. Network diagnostic devices located at network access devices 108b and 108d may determine that they do not have direct connectivity to any network elements which are potentially the source of the signal loss. Accordingly, the network diagnostic devices located at network access devices 108b and 108d may ignore the message. Network diagnostic device 122 and network diagnostic devices located at network access devices 108a and 108c may receive the message and may determine that network element 104, network element 106 or network element 116 or network links connected to them may be sources of the signal loss. Accordingly, network diagnostic device 122 and network diagnostic devices located at network access devices 108a and 108c may respond to the request and may send responses containing data to assist the technician in further isolating the source of the signal loss. Once the technician has further isolated the problem, the technician may send a second request specifying a device identifier which may require only one diagnostic device to provide further data or to perform corrective actions.

In some embodiments, computer 120 may automatically respond to alerts received from a network diagnostic device. For example, a network diagnostic device, which may be communicatively coupled to or contained in network element 110 or network access device 108b, may detect a loss of signal on link 114b. The network diagnostic device may utilize network access device 108b to transmit a wireless signal to network access device 108d. The signal may be forwarded to and interpreted by computer 120. Computer 120 may transmit a request to network access device 108b for data, diagnostic test results, resetting network element 110, rebooting network element 110 or other actions. Computer 120 may also receive the signal from network access device 108b, format the information and transmit the information to an appropriate technician via a page, text message or other wireless communication. Computer 120 may determine the appropriate technician to forward the information or message to based upon a location of the network problem, a location of a technician, a nature of the network problem, a time of day, a customer or user of the network equipment affected, the type of network equipment affected or other factors. Computer 120 may also utilize network access device 108d and network element 118 to receive wireless communications from one or more technicians. Computer 120 may accept one or more commands to forward to one or more network diagnostic devices. Computer 120 may receive results from the one or more commands, such as the results of a request for a light reading from a network diagnostic device communicatively coupled to network element 110, and may forward the results to a technician requesting the results. A technician in the field may utilize a cell phone, a pager, a Blackberry, a laptop, a personal digital assistant or other device capable of sending and/or receiving wireless communication. In some embodiments, a technician may utilize a device capable of wireless communication to transmit commands directly to and/or receive data directly from a network diagnostic device without routing a request via computer 120.

The various components of system 100 as shown in FIG. 1 may be further duplicated, combined and/or integrated to support various applications and platforms. Additional elements may also be implemented in the systems described above to support various applications.

Figure 2:
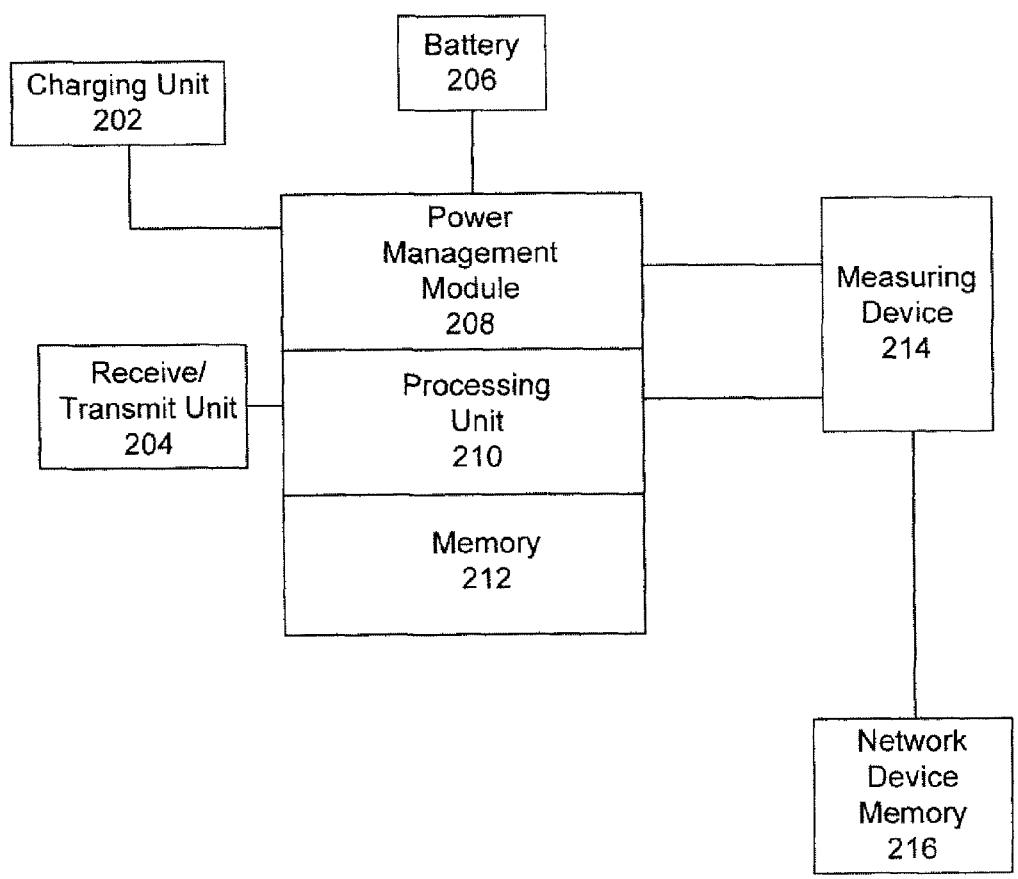
FIG. 2 depicts a network diagnostics apparatus utilizing a secondary communications medium, in accordance with an exemplary embodiment.

Referring to FIG. 2, a network diagnostics apparatus for performing network diagnostics utilizing a secondary communications medium in accordance with an exemplary embodiment is illustrated. System 200 is a simplified view of a network diagnostic utility device and may include additional elements that are not depicted. Charging unit 202 may be coupled to an AC power source (not shown) and may charge battery 206 during normal operation. Battery 206 may be connected to power management module 208. Processing unit 210 may be connected to one or more elements including power management module 208, memory 212, receive/transmit unit 204, and measuring device 214. Measuring device 214 may be connected to network device memory 216.

Battery 206 may receive power to recharge from power management module 208 during normal operation. Power management module 208 may receive power from battery 206 in the event of an outage of primary power and/or AC power (not shown). Battery 206 may enable network diagnostics, data gathering, and/or corrective actions to be performed in the event of a power outage.

Power management module 208 may also monitor power usage and may provide information which may be utilized by the network diagnostic tool for alerts related to one or more power levels of one or more elements of a network diagnostic tool. Power management module 208 may be operatively connected to charging unit 202, battery 206, processing unit 210, receive/transmit unit 204 and/or measuring device 214. Power management module 208 may provide information to processing unit 210 if primary power is lost, if primary power is restored, and/or if battery power is depleted. The information may include information related to the status of a battery such as a charge level, an remaining charging time and/or remaining power. The information provided by power management module 208 may also include information to processing unit 210 which may be used to provide a notification or alert. Processing unit 210 may transmit an alert containing information from power management module 208 to one or more network technicians.

Power management module 208 may also supply power to and/or control the power state of one or more elements of a network diagnostic tool. For example, power management module 208 may control battery and/or power usage of a network diagnostic tool element and may power down an element, such as charging unit 202, measuring device 214 or other elements. Powering down an element may include putting an element in sleep mode, hibernate mode, turning an element off or providing other power conservation measures which may extend battery life and/or reduce power usage. Power management module 208 may also power up or turn on an element. Power management module 208 may power on an element in response to a signal from processing unit 210, as a periodic status check, or in response to predetermined conditions. For example, power management module 208 may power up measuring device 214 if a transmission with a matching device identifier is received with a request for data.

Receive/transmit unit 204 may receive or transmit one or more signals on a secondary communications medium. A secondary communications medium may be a network link separate from a link experiencing a problem. The secondary communications medium may use a different topology and/or a different physical layer for connectivity than a link experiencing a problem. A network diagnostic tool may be communicatively coupled to one or more network elements linked to a wired network, such as a passive optical network or links 114a and 114b of FIG. 1. Receive/transmit unit 204 may be communicatively coupled to a secondary communications medium such as a wireless network or a paging network, which may enable receive/transmit unit 204 to receive and/or transmit one or more signals via the wireless network. Receive/transmit unit 204 may utilize encryption or other security mechanisms for the secure transmission or reception of data.

Information transmitted by receive/transmit unit 204 may be received by a receive/transmit unit associated with a second network device such as a network access device associated with an optical line termination at a provider central location. Receive/transmit unit 204 may utilize a unique identifier to determine whether to respond to a request, or to ignore a request and remain in a sleep mode. In some embodiments receive/transmit unit 204 may only transmit data, such as transmitting an alert or data when one or more predetermined conditions occurs. In one or more embodiments receive/transmit unit 204 may only receive transmissions. For example, a unit may be capable of only receiving transmissions to perform one or more actions, such as restoring default settings, rebooting a device, or accepting software to update a device.

Processing unit 210 may contain one or more central processing units (CPUs) and may enable the execution of one or more instructions for the management of a network diagnostic tool. For example, processing unit 210 may utilize measuring device 214 to receive information regarding the status of one or more network devices and/or the status of one or more network links communicatively coupled to those devices. Processing unit 210 may utilize one or more signals received from measuring device 214 to detect a change in status of a network device or network link, a problem and/or another condition related to a network device or network link. Processing unit 210 may execute one or more instructions to transmit information related to the status change via receive/transmit unit 204. The information may be received by one or more technicians and/or devices monitoring the network. Processing unit 210 may also request further information from measuring device 214 or perform other actions. Processing unit 210 may receive a signal from receive/transmit unit 204 requesting data related to a status or condition of a network device or network link to which a network diagnostic tool is communicatively coupled. For example, a network technician may receive reports related to a network outage on a passive optical network. The network technician may send a wireless signal, such as a page, requesting information. The signal may be received by receive/transmit unit 204 which may determine whether the signal is intended for a network diagnostic device associated with receive/transmit unit 204. If the signal contains a device identifier matching an identifier stored in memory 212, receive/transmit unit 204 may transfer the signal to processing unit 210. In some embodiments, all signals may be transferred to processing unit 210 which may determine if a signal contains an appropriate or matching device identifier. Processing unit 210 may execute instructions causing measuring device 214 to provide the requested information to processing unit 210. Processing unit 210 may format, analyze or interpret one or more portions of data received from measuring device 214. Predetermined rules may be applied to perform one or more actions, such as running a diagnostic test, when a condition is identified in data received from measuring device 214. Processing unit 210 may utilize receive/transmit unit 204 to transmit the requested information to the network technician.

Processing unit 210 may enable a network diagnostic device to perform one or more actions on a network element to which the network diagnostic device is communicatively coupled Processing unit 210 may enable a network diagnostic device to reset or reboot a network device to which the network diagnostic device is coupled. Processing unit 210 may execute instructions to reset or reboot a network device in response to a status or condition detected by analyzing data received from measuring device 214. Processing unit 210 may also execute instructions to reset or reboot a network device in response to instructions received from a network technician or a network management system via transmit/receive unit 204. Processing unit 210 may enable loading of software or updates on a network device to which it is communicatively coupled. Processing unit 210 may also enable the scanning of a network device or the running of diagnostic software to test a network device to which the network diagnostic tool is communicatively coupled.

Processing unit 210 may utilize one or more instructions, program code or data which may be stored in memory 212. Memory 212 may be read only memory (ROM) or firmware. Memory 212 may also be random access memory (RAM), disk, tape or other storage for containing a processor readable medium. Memory 212 may be a combination or RAM, ROM and other storage. Memory 212 may contain an operating system, diagnostic tools diagnostic utilities and/or other software. Memory 212 may contain a device assigned unique identifier and may contain encryption information such as an encryption key, a public key, a shared secret and/or a digital certificate.

Measuring device 214 may read one or more indicators of the network element to which it is communicatively coupled. Measuring device 214 may read information from a network device to which they are communicatively coupled such as the contents of RAM, ROM or other storage associated with the network device. Information may include one or more status indicators providing information about the functioning of the network device, the status of one or more links to which the network device is connected, or other status information. Measuring device 214 may measure information related to signals received by or transmitted by the network device. Such readings may include but are not limited to: a reading of optical light strength or attenuation of an optical signal received by the network device; a voltage reading measuring signals transmitted by and/or received by the network device; and/or a Radio Frequency (RF) reading of signals transmitted by and/or received by the network device. Measuring device 214 may obtain measurements from a signal splitter at one or more inputs or outputs of a network device and/or from memory associated with a network device, such as network device memory 216. Measuring device 214 may utilize a light meter, a voltmeter, or other diagnostic equipment to obtain measurements.

Measuring device 214 may store data related to one or more readings on memory, such as RAM or disk which may be associated with measuring device 214. Measuring device 214 may also utilize one or more portions of memory 212 to store data associated with one or more readings. Measuring device 214 may provide data to processing unit 210 in response to a request from processing unit 210. Measuring device 214 may also provide a continuous stream of data to processing unit 210, may provide data at periodic intervals and/or may provide data to processing unit 210 if a status or an indicator has changed. Measuring device 214 may collect data continuously, may collect data at periodic or scheduled intervals, or may collect data in response to a request. Measuring device 214 may store data in memory which may be contained on measuring device 214 or may be coupled to measuring device 214. Data collected and stored in memory may be aged out or deleted after a period of time, may be archived to secondary storage after a period of time, or may be deleted in response to a command from processing unit 210.

Network device memory 216 may be the memory of one or more network devices to which a network diagnostic device is communicatively coupled. Network device memory 216 may be RAM, ROM or other storage which may contain data of a network device. Network device memory 216 may contain data sent or received by a network device, an operating system, utilities, programs, network device measurements and/or other data related to the network device.

Figure 3:
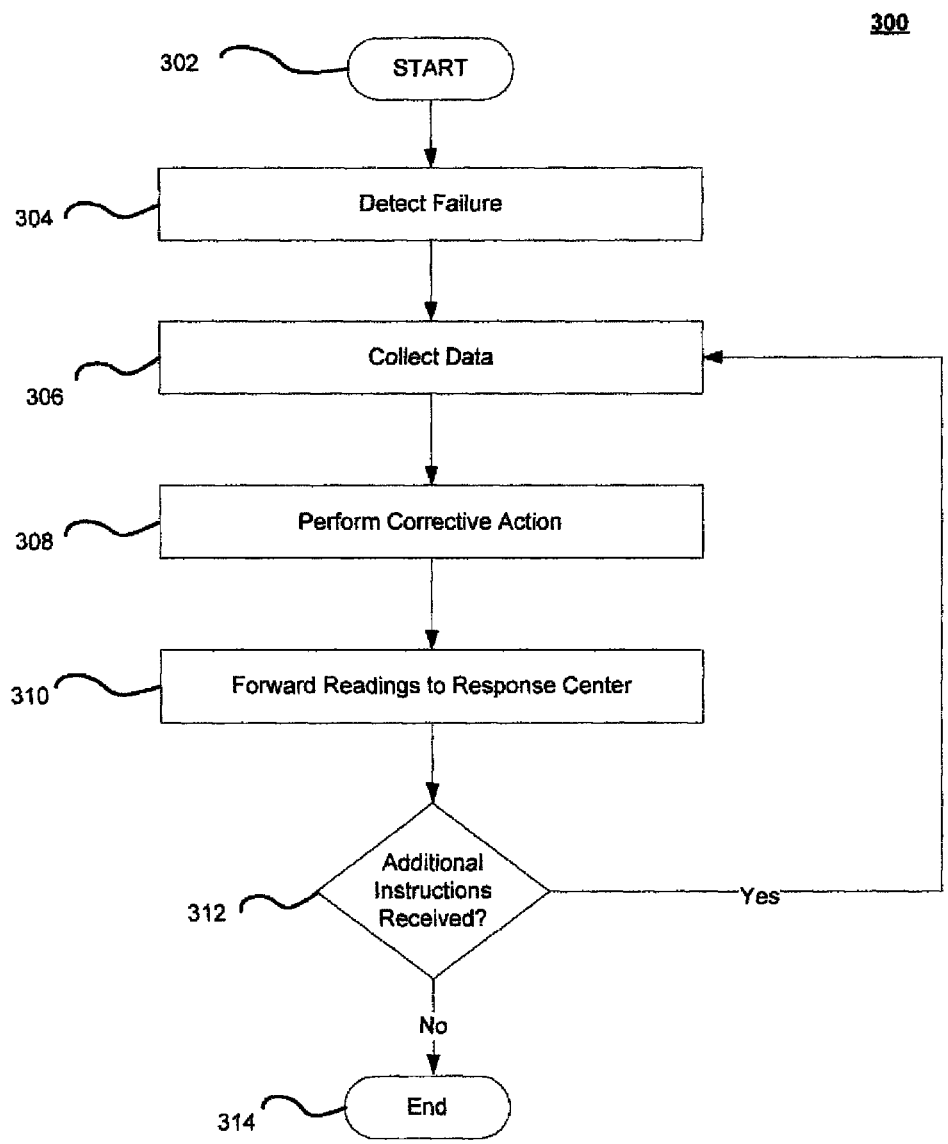
FIG. 3 depicts a method for performing network diagnostics utilizing a secondary communications medium, in accordance with an exemplary embodiment.

FIG. 3 illustrates a flow diagram of a method 300 for performing network diagnostics utilizing a secondary communications medium, in accordance with exemplary embodiment. This exemplary method 300 is provided by way of example, as there are a variety of ways to carry out the method. The method 300 shown in FIG. 3 can be executed or otherwise performed by one or a combination of various systems. The method 300 is described below may be carried out by the network diagnostic systems 100 and 200 shown in FIGS. 1 and 2 by way of example, and various elements of the detection system 100 and 200 are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 304, an event such as a transmission failure, a change in a network condition, a network status, a device status or a device condition may be detected. For example, a network link, such as link 114a, may be down or may be experiencing performance problems. A diagnostic device may be located at or communicatively coupled to network element 106, network access device 108a, network element 116 and/or network access device 108c. In some embodiments, a network diagnostic device, such as the device depicted in FIG. 2, may detect the condition. In some embodiments, the condition may be detected by a technician or a network management system or reported to a technician or a network management system.

At block 306, data related to the network condition or network device condition may be collected. In some embodiments, data may be collected continuously and one or more portions of data may be sent in response to a request for data, such as a request from processing unit 210. Data may also be collected periodically according to a predetermined schedule. In one or more embodiments, a measuring or collection device, such as measuring device 214, may sleep or remain in a powered off or low power usage state and may power up and begin collecting data in response to a request from processing unit 210. Power management unit 208 may be utilized to power measuring device 214 up. In some embodiments, data may not be collected.

At block 308, a network diagnostic device may perform corrective action. Corrective action may include resetting the state of a network device, powering off and powering on a network device, rebooting a network device, restoring default settings of a network device, running a diagnostic utility on a network device, updating software on a network device or other actions which may enable the restoration of normal or improved operation of a network device. In some embodiments, corrective action may include shutting a problematic network device down to avoid interference with network operations. In some embodiments, a problem may be diagnosed, corrective action may not be taken and a technician may be required to repair, reset or replace problematic equipment to restore service.

At block 310, collected data or data based in part on collected data may be forwarded to a response center, a network technician and/or a network management system. The collected data may be forwarded in response to a request received by a network diagnostic device or a network diagnostic device may transmit the collected data in response to an event detected by the network diagnostic device on a network link or a network device.

At block 312, a network diagnostic device may receive additional instructions or may detect additional data which may require further data collection or corrective actions. If additional actions or data collection are required the method may continue at block 306. If no further data or action is required the method may end at block 314.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   detecting one or more problems associated with a first network element and a network communications link of a primary communications medium;
   performing one or more corrective actions on the first network element communicatively coupled to the network communications link in response to detection of the one or more problems, wherein the first network element is comprised of a network device and a diagnostic device that is communicatively coupled to the network device and communicatively coupled to a secondary communications medium, and the diagnostic device communicatively coupled to the network device enables the transmission of data over the secondary communications medium and enables the performance of one or more corrective actions on the network device; and
   transmitting data associated with the one or more problems from the first network element to a second network element utilizing the secondary communications medium, wherein the primary communications medium and the secondary communications medium are distinct and wherein further the second network element determines the one or more corrective actions performed on the first network element.

2. The method of claim 1, wherein the data transmitted comprises one of: data based at least in part on one or more optical signals received by the first network element, data based at least in part on one or more electrical signals transmitted by the first network element, data based at least in part on one or more radio signals transmitted by the first network element, a status of one or more indicators of the first network element, and data based at least in part on one or more portions of information retrieved from memory of the first network element.

3. The method of claim 1, wherein the data is transmitted in response to a request from the second network element.

4. The method of claim 3, further comprising:
   utilizing the second network element to detect the one or more problems of the network communications link; and
   sending a request to perform one or more corrective actions to the first network element from the second network element utilizing the secondary communications medium.

5. The method of claim 3, wherein the second network element multicasts the request and one or more secondary network elements receive the request.

6. The method of claim 3, further comprising one or more first network elements responding to the request in the event the request matches a predetermined condition.

7. The method of claim 6, wherein the predetermined condition is the matching of an identifier in the request to a stored identifier on the first network element.

8. The method of claim 3, wherein the request is sent via one of a page and a text message.

9. The method of claim 1, wherein the data is transmitted in response to the first network element detecting the one or more problems associated with the network communications link.

10. The method of claim 1, wherein the first network element multicasts the transmission of data to one or more second network elements.

11. The method of claim 1, wherein the secondary communications medium is one of a paging network and a mobile network.

12. The method of claim 1, wherein at least one of the one or more corrective actions is one of resetting the state of the first network element to a default state and powering a first network element off and on.

13. The method of claim 1 wherein the first network element comprises one or more of: an optical splitter, an optical network terminal, an optical network unit, a fiber drop terminal, a hub, a residential gateway and a headend.

14. The method of claim 1 wherein the second network element comprises an optical line terminal.

15. The method of claim 1 wherein the network communications link comprises a link in a passive optical network.

16. A system, comprising:
a first network element communicatively coupled to a network communications link of a primary communications medium;
a second network element communicatively coupled to the first network element and disposed at same location as the first network element, wherein the second network element is communicatively coupled to a secondary communications medium and the second network element is configured to:
determine one or more corrective actions based at least in part on one or more problems associated with the first network element and the network communications link;
perform the one or more corrective actions on the first network element; and
transmit data related to the one or more problems, from the second network element to a third network element, in response to a request from the third network element, utilizing the secondary communications medium, wherein the primary communications medium and the secondary communications medium are distinct.

17. The system of claim 16, wherein the second network element contains a battery and is operational in the event of a power outage.

18. A system, comprising:
a first network element communicatively coupled to a network communications link of a primary communications medium;
a second network element communicatively coupled to the first network element and disposed at same location as the first network element, wherein the second network element is communicatively coupled to a secondary communications medium and the second network element is configured to:
determine one or more corrective actions based at least in part on one or more problems associated with the first network element and the network communication link;
perform the one or more corrective actions on the first network element; and
receive data comprising instructions regarding further actions from a third network element utilizing the secondary communications medium, wherein the primary communications medium and the secondary communications medium are distinct.

* * * * *